United States Patent [19]
Klement

[11] 3,727,601
[45] Apr. 17, 1973

[54] BAKING AND ROASTING OVEN

[75] Inventor: Johann Klement, Traunreut, Germany

[73] Assignee: Siemens-Electrogerate GmbH, Berlin and Munich, Germany

[22] Filed: Feb. 9, 1972

[21] Appl. No.: 224,693

[30] Foreign Application Priority Data

Feb. 12, 1971  Germany.....................P 21 06 775.4

[52] U.S. Cl.................................126/21 A, 219/400
[51] Int. Cl........................................A21b 1/26
[58] Field of Search..............................126/21, 273; 219/400; 263/19 A

[56] References Cited

UNITED STATES PATENTS 3,474,225  10/1969  Leedy................................126/21 A
3,530,278  9/1970  Tilus..................................219/400 X

*Primary Examiner*—Edward G. Favors
*Attorney*—Arthur E. Wilfond et al.

[57] ABSTRACT

Baking and roasting oven which includes a muffle chamber having a top wall, a bottom wall and a lateral wall extending between the top and bottom walls, also has a heating means including a circulating blower for hot air, a blower channel for the hot air circulated by the blower, the blower channel interconnecting respective hot air exhaust and hot air injection openings and injection openings being at an elevation of at least one-fourth the height of the muffle chamber from the bottom wall thereof.

21 Claims, 8 Drawing Figures

BAKING AND ROASTING OVEN

The invention relates to a baking and roasting oven, more particularly having a muffle chamber, a heating device which includes a circulating blower for hot air and a blower duct connecting hot air exhaust and injection openings formed in the wall of the muffle chamber.

A baking and roasting oven of this general type is known from British Pat. No. 1,088,663. The circulating blower which, together with a heating member make up the heating device, serves for effecting a so-called self-cleaning operation in which the muffle chamber is heated to such a high temperature (over 500°C) by circulating hot air that residues and impurities which adhere to the inner wall of the muffle chamber automatically become incinerated.

The exhaust openings and injection openings for the circulated hot air are located in the bottom wall of the muffle chamber in the embodiment of the aforementioned British Patent. A consequence of this disposition of the exhaust and injection openings is that a vertically directed flow of hot air is produced within the muffle chamber during operation of the circulating blower. The incoming hot air flows from the bottom wall of the muffle chamber toward the top wall of the muffle chamber and flows back therefrom toward the bottom wall, in direction of the exhaust openings.

It has been found that the heretofore known disposition of the exhaust and injection openings in the wall of the muffle chamber and the vertical flow of the circulating hot air that is associated therewith entail various disadvantages.

First of all, there is the possibility that the previously incinerated residues will fall off the wall of the muffle chamber, will be sucked into the circulating blower, and possibly clog the latter. This circumstance is particularly detrimental when the sucked-in residues adhere to the heating member of the circulating blower and ignite thereon. This can markedly reduce the durability of the heating member.

Usually, the baking and roasting ovens have other heating members in addition to the heating member for the circulating blower which are coordinated as "upper heat" and "lower heat" for the top and bottom walls, respectively, of the muffle chamber. When a self-cleaning operation is performed, these other heating members cooperate with the heating member of the circulating blower. When the flow of circulated hot air is directed toward the top and bottom walls of the muffle chamber, it is then noticeable that these walls detrimentally attain considerably higher temperatures than the remaining parts of the muffle chamber because they are subjected to a summation of the "upper" and "lower heats" as well as the heat of the circulated hot air. Of the disadvantageous consequences of this thermal inequality, there might be noted primarily, the danger that the muffle chamber walls may warp, thereby causing cracking or rupture of the enamel layer, applied thereto for protection against oxidation.

It is accordingly an object of the invention to provide a baking and roasting oven of the foregoing type having a heating device which functions especially reliably with respect to the circulating blower during the self-cleaning operation and which also affords thermal balance or equilibrium of the muffle chamber, particularly when an "upper" and "lower heat" is provided at the top and bottom wall, respectively, of the muffle chamber.

With the foregoing and other objects in view, there is provided in accordance with the invention, baking and roasting oven including a muffle chamber having a top wall, a bottom wall and a lateral wall extending between the top and bottom walls, including a heating means having a circulating blower for hot air, a blower channel for the hot air circulated by the blower, the blower channel interconnecting respective hot air exhaust and hot air injection openings formed in the lateral wall of the muffle chamber, the exhaust and injection openings being at an elevation of at least one-fourth the height of the muffle chamber from the bottom wall and the top wall thereof.

In accordance with another feature of the invention, both the exhaust and injection openings are located at the same level.

Thus, in a relatively simple manner, incinerated residues are prevented from falling through the exhaust openings into the circulating blower during the self-cleaning operation. The residues collect on the bottom wall of the muffle chamber from which the exhaust openings of the circulating blower are spaced a distance corresponding to at least one fourth of the height of the muffle chamber. The residues that collect on the bottom wall of the muffle chamber can not be whirled upwardly again through the incoming hot air, because the injection openings, according to the invention, are also located at a distance from the bottom wall that corresponds to one fourth of the height of the muffle chamber. In accordance with another, and particularly preferable embodiment of the invention, the exhaust and injection openings are located at a distance from the bottom wall of the muffle chamber that corresponds to about half the height of the muffle chamber.

Another advantage of the baking and roasting oven stems from the disposition of both the exhaust and injection openings at the same level of the muffle chamber so that the flow of circulating hot air is in a substantially horizontal direction and thereby primarily comes into contact with the side walls of the muffle chamber and heats them. The invention is therefore used to particular advantage in such baking and roasting ovens that are provided with an "upper" and "lower heat" for the top and bottom walls, respectively, of the muffle chamber. When a self-cleaning operation is carried out, the muffle chamber is heated largely to thermal balance or equilibrium so that more rapid heating is possible than with the heretofore known self-cleaning ovens operating without blowers.

In accordance with yet another feature of the invention, the exhaust and injection openings are located in the rear wall of the muffle chamber. The side walls of the muffle chamber are effectively heated when, in accordance with the invention, the mutual spacing of the exhaust and the injection openings is equal to at least half the width of the rear wall. The heating device of the baking and roasting oven then heats the side walls of the muffle chamber by means of the circulating blower, and the top and bottom walls are heated by the "upper" and "lower heat". By disposing the exhaust and injection openings in the rear wall of the muffle chamber, it is also possible to guide the horizontally directed flow of the circulated hot air to the inner surface of the door of the baking and roasting oven that is located on the side of the muffle chamber which is opposite the rear wall of the muffle chamber. The circulated hot air then also ensures a thorough cleaning of the inner surface of the door.

Locating the exhaust and injection openings preferably at the same muffle chamber height affords the advantage that the blower channel, which interconnects the exhaust and injection openings, assumes a horizontal position, in accordance with the invention. The blower channel is disposed parallel to zones of equal temperature, because any heat gradient, which may, on occasion, occur through the wall of the muffle chamber, is noticeably strongest in vertical direction. Therefore, in the baking and roasting oven of the invention, no significant temperature differences and consequent expansion differences, which can cause thermal stresses, will occur between the blower channel and the wall of the baking and roasting oven. Total protection against thermal stresses can be attained if, in accordance with an additional feature of the invention, the blower channel is floatingly or yieldably mounted with respect to the wall of the muffle chamber.

Other features which are considered as characteristic for the invention are set forth in the appended claims.

Although the invention is illustrated and described herein as embodied in baking and roasting oven, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 5:
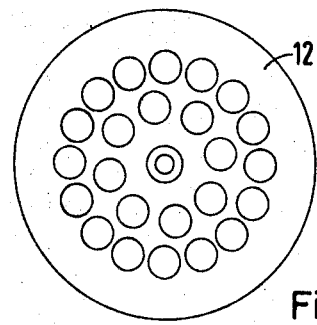
Figure 6:
Figure 7:
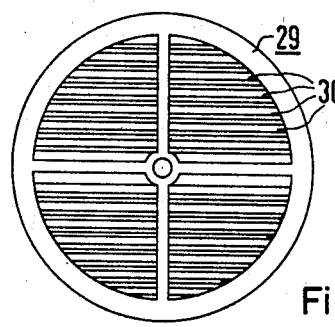
Figure 8:
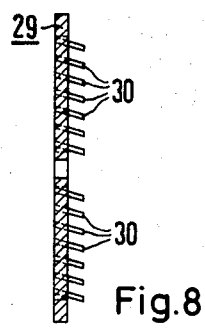
Figure 2:
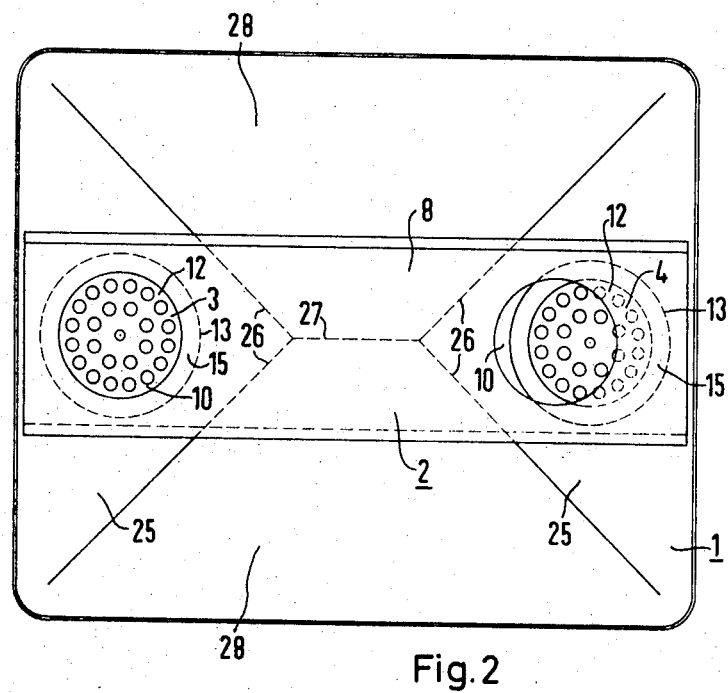
FIG. 2 is an enlarged elevational view of the rear wall of the muffle chamber surmounted by the blower channel shown in FIG. 1.

FIGS. 5 and 6 are enlarged plan and sectional views, respectively, of one of the perforated discs inserted into the rear wall of the muffle chamber as shown in FIG. 2; and FIGS. 7 and 8 are views similar to FIGS. 5 and 6, respectively, of a modified form of the perforated disc.

Figure 1:
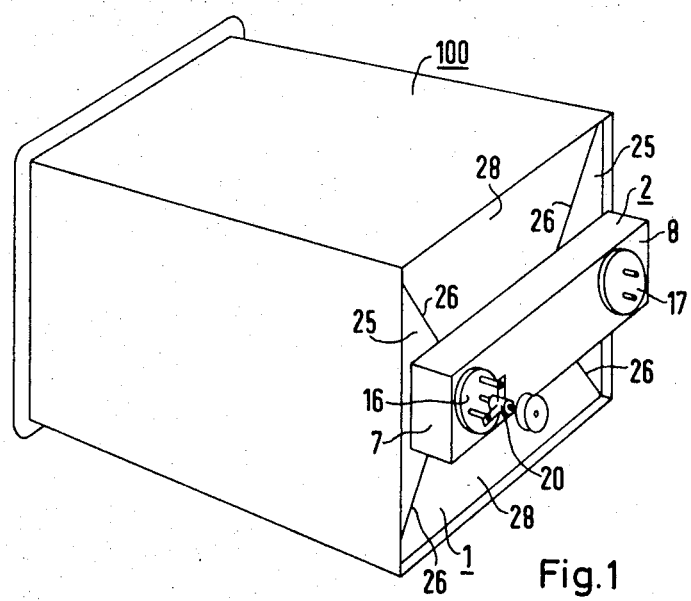
FIG. 1 is a perspective view of the muffle chamber of a baking and roasting oven showing a blower channel mounted on the rear wall thereof and having a blower and a heating member installed therein.
Figure 4:
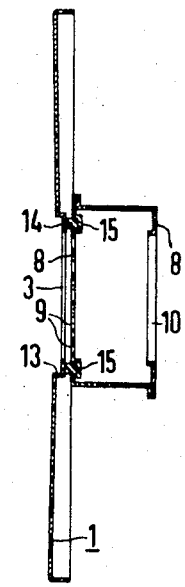
FIG. 4 is a sectional view of FIG. 2, taken along the line IV — IV, in the direction of the arrows.

Referring now to the drawings, and first particularly to FIGS. 1 and 4 thereof, there is shown therein a rear wall 1 of a muffle or muffle chamber 100 of a baking and roasting oven, on which there is mounted, at about half the height of the muffle chamber, a blower channel or duct 2 which interconnects an exhaust or suction opening 3 formed in the rear wall 1 of the muffle chamber 100 and an injection opening 4 also formed in the rear wall 1.

The blower channel 2 is formed of a hollow profile member, closed at the ends thereof by plates 7 and accommodating therewithin a heating member 5 and a fanwheel blower or impeller 6, the hollow profile member having a rectangular cross section. In particular, the blower channel is formed of two similar wall portions 8 which are mutually displaced 180° and spot-welded through the intermediary of the plate 7.

Figure 3:
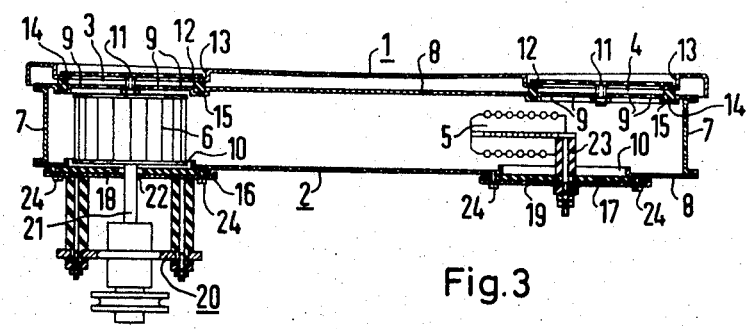
FIG. 3 is a cross-sectional view of FIG. 2, taken along the line III — III in the direction of the arrows.

That wall portion 8 of the blower channel 2 which faces the rear wall 1 of the muffle is provided with openings 9 that are adjusted or accommodated to the exhaust and injection openings 3 and 4, respectively, and, in the wall portion 8 facing away from the rear wall 1, entry openings 10 are provided for the fanwheel blower 6 and for heating member 5 (FIG. 3).

The rear wall 1 and the blower duct or channel 2 are connected by screws 11, which pass centrally through the wall portion 8 of the blower channel or duct 2 that faces the rear wall 1 of the muffle chamber 100, as well as centrally through perforated discs 12 which cover the exhaust and injection openings 2 and are located at the inner surface of the rear wall 1. The perforated discs 12 are inserted in stampings 13 formed in the rear wall 1 and having edges which surround the perforated discs 12 with clearance. The blower channel or duct 2 is mounted so as to be spaced from the rear wall 1, annular seals 14 of heat damming or insulating material being disposed therebetween. The annular seals 14 are inserted into depressions 15 formed in the wall portion 8 that faces the rear wall 1.

The entry openings 10 formed in the wall portion 8 of the blower channel or duct 2 faces away from the rear wall 1 of the muffle chamber 100, are covered by flange plates 16 and 17 that are provided on their interior side, with a heat-damming or insulating lining 18 and 19, respectively. The flange plate 16 is carrier of the bearing 20 for the shaft 21 of the fanwheel blower 6. The flange plate 16 and the thermally insulating lining 18, surround the shaft 21 with clearance so as to define an annular gap 22 therebetween. The flange plate 17 is carrier of the heating member 5, which includes a bolt 23 that extends through the flange plate 17 and is threadedly secured to the flange plate 17 so as to be thermally coupled therewith. The flange plates 16 and 17 are secured to the wall portion 8 by screws 24.

The aforedescribed assembly and holding system produce a floating mounting or positioning of the blower channel or duct 2 with respect to the rear wall 1 of the muffle chamber 100. The perforated discs 12 serve as holding members proper for the blower channel or duct 2 at the rear wall 1 and are fastened by screws 11 to the blower channel or duct 2. The stampings 13 formed in the rear wall 1 surround the perforated discs 12 with such clearance that the blower channel or duct 2 with the perforated disc 12 has a predetermined freedom of movement with respect to rear wall 1. Preferably, the tightening force exerted by the screws 11 will be adjusted so that the blower channel or duct 2 is pressed against the annular seals 14 with adequate holding force, yet permitting, on the other hand, adjustment or compensation for any differences in thermal expansion that may occur between the blower channel or duct 2 and the rear wall 1. It is advantageous for the annular seals 14 to be formed, for example, of graphitized asbestos material, which has a beneficial effect upon the length adjustment or equalization due to the slideability thereof.

The mutual spacing between the exhaust and injection inlet openings 3 and 4, respectively, formed in the rear wall 1 of the muffle chamber 100 has been selected at a maximum, in the illustrated embodiment, taking into consideration the dimension of the blower channel or duct 2. The exhaust and injection openings 3 and 4, thus become positioned in triangular fields 25 of the rear wall 1, which are defined by the stamping edges 26 formed in the rear wall 1. This disposition of the exhaust and injection openings 3 and 4 insures that the side walls of the muffle 100, as well as a non-illustrated door which closes the front side of the muffle 100, are swept over by the circulated hot air flow and adequately heated. The stamping edges 26 define, together with another stamping edge 27, two additional trapezoidal fields 28 which are inclined at a flat or obtuse angle toward one another and toward the fields 25.

The camber or curvature of the rear wall which is thereby produced is advantageous with respect to the thermal expansion characteristics of the rear wall 1, and can be employed also for all other walls of the muffle chamber 100.

It can be advantageous to construct the perforated disc for the injection opening 4 as a guide disc 29 (FIGS. 7 and 8) which has a screen-type raster with inclined lamellae 30. This offers the possibility of deflecting the hot air which emerges from the injection opening 4 so that it travels at an angle to the axis of the guide disc 29. This possible deflection of the hot air is advantageous when there is a need to have the hot air blow against specific parts of the inner wall surface of the muffle chamber 100, and can, moreover, be used also by properly 10 equipping the exhaust opening 3 for the hot air discharging from the muffle chamber 100. The use of the guide discs 29 is not limited to self-cleaning operations but is also especially suitable for carrying out baking and roasting operations by means of circulated hot air.

It is advantageous that the guide disc 29 be mounted so that they are pivotable with respect to the rear wall 1 and that they be provided with an adjusting handle, in a manner not illustrated in the drawings. Actually, a pivotable bearing is provided for the guide discs 29 by means of the screws 11 that are used in connection with the perforated discs 12 (FIGS. 1 to 6). The possibility of deflecting the flow of the circulated air afforded by the guide discs 29 can then be adjusted in a relatively simple manner to the respective operational requirements.

I claim:

1. Baking and roasting oven including a muffle chamber having a top wall, a bottom wall and a lateral wall extending between the top and bottom walls, comprising a heating means including a circulating blower for hot air, a blower channel for the hot air circulated by said blower, said blower channel interconnecting respective hot air exhaust and hot air injection openings formed in the lateral wall of the muffle chamber, said exhaust and injection openings being at an elevation of at least one-fourth the height of the muffle chamber from the bottom wall and the top wall thereof.

2. Baking and roasting oven according to claim 1 wherein said exhaust and injection openings are located at the same level of the muffle chamber.

3. Baking and roasting oven according to claim 2 wherein said exhaust and injection openings are located at an elevation one half the height of the muffle chamber.

4. Baking and roasting oven according to claim 1 wherein lateral wall of the muffle chamber is the rear wall thereof, and said exhaust and injection openings are formed in the rear wall.

5. Baking and roasting oven according to claim 4 wherein said exhaust opening and said injection opening are mutually spaced apart a distance corresponding to at least half the width of the rear wall.

6. Baking and roasting oven according to claim 1 wherein said blower channel is floatingly mounted with respect to the lateral wall of the muffle chamber.

7. Baking and roasting oven according to claim 1 including annular seals of heat-damming material disposed coaxially to said exhaust and injection openings, said blower channel being mounted spaced from the lateral wall of the muffle chamber, said annular seals being interspersed between the lateral wall and the blower channel.

8. Baking and roasting oven according to claim 7 wherein the lateral wall of the muffle chamber is formed with depressions, and said annular seals are received in said depressions.

9. Baking and roasting oven according to claim 7 wherein said blower channel is formed with depressions, and said annular seals are received in said depressions.

10. Baking and roasting oven according to claim 1 wherein said blower channel is formed of a hollow profile member closed at the ends thereof and containing a heating member and a fanwheel blower therein.

11. Baking and roasting oven according to claim 10 wherein said hollow profile member has a rectangular cross section.

12. Baking and roasting oven according to claim 1 including perforated discs covering said exhaust and injection openings, respectively, said perforated discs being located at the inner side of the muffle chamber and being fastened by central screws to said blower channel.

13. Baking and roasting oven according to claim 12 wherein the lateral wall of the muffle chamber is formed with stampings wherein said perforated discs are received, said stampings having an edge surrounding the respective perforated discs with clearance.

14. Baking and roasting oven according to claim 12 wherein said perforated discs are formed as guide discs having means for deflecting hot air exhausting from said exhaust opening so that it travels at an angle to the axis of the guide discs.

15. Baking and roasting oven according to claim 14 wherein said guide discs are mounted so as to be pivotable relative to the lateral wall of the muffle chamber.

16. Baking and roasting oven according to claim 15 wherein said guide discs have a screen-type raster with inclined lamellae.

17. Baking and roasting oven according to claim 14 wherein said guide discs have a respective adjusting handle.

18. Baking and roasting oven according to claim 1 wherein said blower channel has a side facing the muffle chamber, said blower channel side being formed with passages accommodated to said exhaust and injection openings.

19. Baking and roasting oven according to claim 18 wherein said blower channel has a side facing away from the muffle chamber, said latter side being formed with inlet openings disposed opposite said passages and adapted to accommodate therein a fanwheel blower and a heating member, respectively.

20. Baking and roasting oven according to claim 19 including flange plates covering said inlet openings, said flange plates having a lining of heat-damming material on the side thereof facing said inlet openings.

21. Baking and roasting oven according to claim 20 including respective bearing means for said fanwheel blower and said heating member, said flange plates serving as carriers for the respective bearing means.

* * * * *